United States Patent

Pickles

[11] 3,874,722
[45] Apr. 1, 1975

[54] SUN ROOF GEAR BOX
[75] Inventor: Joseph Pickles, Birmingham, Mich.
[73] Assignee: Ferro Manufacturing Corporation, Detroit, Mich.
[22] Filed: Mar. 20, 1973
[21] Appl. No.: 343,125

[52] U.S. Cl. .......................... 296/137 G, 74/421 R
[51] Int. Cl. ............................................. B60j 7/04
[58] Field of Search......... 296/137 D, 137 E, 137 F, 296/137 G; 74/421 R, DIG. 10

[56] References Cited
UNITED STATES PATENTS

| | | | |
|---|---|---|---|
| 2,857,777 | 10/1958 | Porter | 74/DIG. 10 |
| 3,079,195 | 2/1963 | Golde et al. | 296/137 |
| 3,214,990 | 11/1965 | Jekat | 74/421 |
| 3,266,328 | 8/1966 | Rott | 296/137 |

FOREIGN PATENTS OR APPLICATIONS
602,013  2/1960  Italy.................................. 296/137

Primary Examiner—Albert J. Makay
Assistant Examiner—Ross Weaver
Attorney, Agent, or Firm—Whittemore, Hulbert & Belknap

[57] ABSTRACT

A power actuator for a sliding sun roof panel comprising an electric motor connected to an output worm, a worm gear, and gear assembly comprising a pinion in mesh with the worm gear, and a drive gear coupled to the pinion and in mesh with the flexible actuating elements of two Teleflex devices coupled to the sliding panel. In a preferred form, the worm gear and pinion are spiral bevel gears.

4 Claims, 8 Drawing Figures

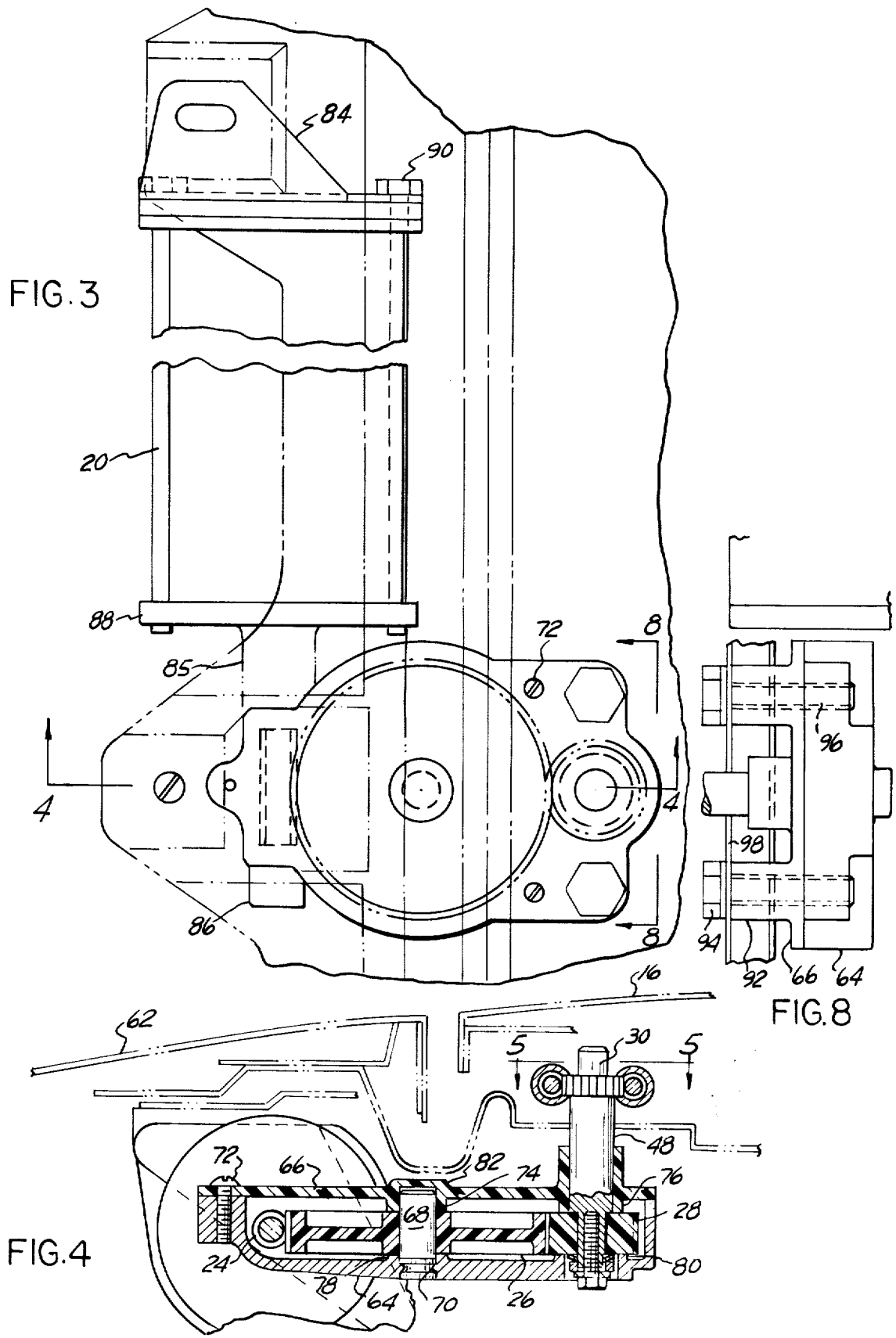

SUN ROOF GEAR BOX

BRIEF SUMMARY OF THE INVENTION

Automobiles provided with the so-called sun roof have a relatively large generally rectangular opening which is adapted to be selectively closed by a sliding panel. In accordance with the present invention, power actuation is provided for the sliding panel which comprises an electric motor having an output worm, a worm gear in mesh with the worm, a pinion in mesh with the worm gear, and a drive gear coaxial with and rigidly connected to the pinion. The drive gear is in mesh at opposite sides with the flexible actuating elements of two driving units sold under the trade name "Teleflex."

The Teleflex units comprise essentially a tubular housing which may be bent to required configuration, in which is longitudinally slidable an actuating element in the form of a flexible core element wrapped with a wire disposed in a helical confiruration so as to provide the equivalent of rack teeth at one side of the flexible core. At a convenient point the housing is provided with an opening through which a peripheral portion of a driving gear extends so that its teeth may engage with the wound wire wrapping on the core in the manner of a pinion engaging with the teeth of a rack. The housing is sufficiently flexible to permit it to be bent into a required configuration, and the core is sufficiently flexible so that it will follow curved bent portions of the housing as the core is driven by the gear in either of the two opposite directions.

At the output end the Teleflex drive unit includes a slotted portion through which a coupling element extends, connected at the interior with the core and adapted to be connected at its exterior to the member which is to be moved by the drive unit.

In the case of the sun roof, this permits a Teleflex drive unit to be provided at each side of the sliding panel and to have portions of the housings bent to extend transversely of the vehicle in laterially spaced relation so that both wire wrapped flexible core members may be driven simultaneously by a single drive gear. It will be apparent that rotation of the gear in one direction will cause the output coupling members of the Teleflex units to move in the same direction, and reverse rotation of the drive gear will cause the coupling members to move in opposite direction.

While the worm gear and the pinion in mesh therewith may both be cylindrical toothed members, it is preferred to provide these members in the form of spiral bevel gears.

BRIEF DESCRIPTION OF THE DRAWINGS

FIG. 3 is an enlarged plan view of the motor and gearing of the power assembly.

FIG. 4 is a fragmentary section on the line 4--4, FIG. 3.

FIG. 8 is a fragmentary elevation looking in the direction of the arrows 8—8, FIG. 3.

DETAILED DESCRIPTION

Figure 1:
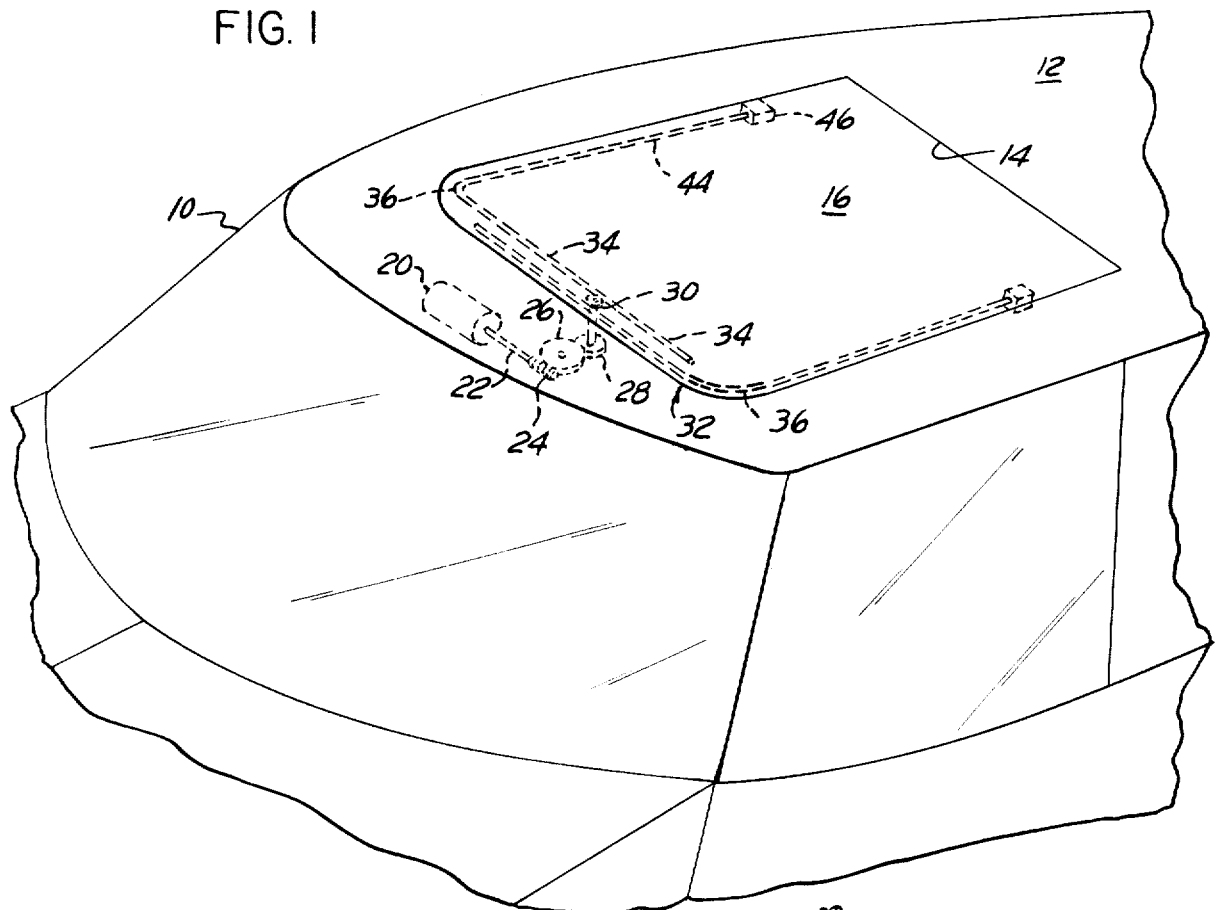
FIG. 1 is a fragmentary perspective view showing the relationship between components of the sun roof and drive assembly.
Figure 2:
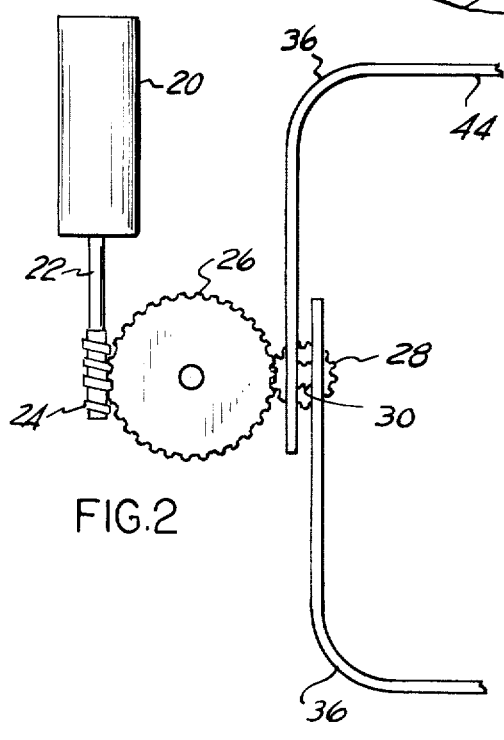
FIG. 2 is an enlarged diagrammatic plan view of the power actuating mechanism.

Referring first to FIG. 1 there is shown a portion of a motor vehicle 10 having a roof 12 provided with a generally rectangular opening 14 which is adapted to be closed by a sliding panel 16. In FIG. 1 the panel 16 is shown in its forward closing position and it is adapted to be moved rearwardly to uncover a desired portion of the opening 14.

Power means are provided for effecting movement of the sliding panel and this means comprises a motor 20 having an output shaft 22 connected to a worm 24 which is in mesh with a worm gear 26. The worm gear 26 meshes with the pinion 28 connected to a drive gear or pinion 30 associated with drive units commercially available under the trade name Teleflex and illustrated in their entirety in FIG. 1 at 32.

Figure 5:
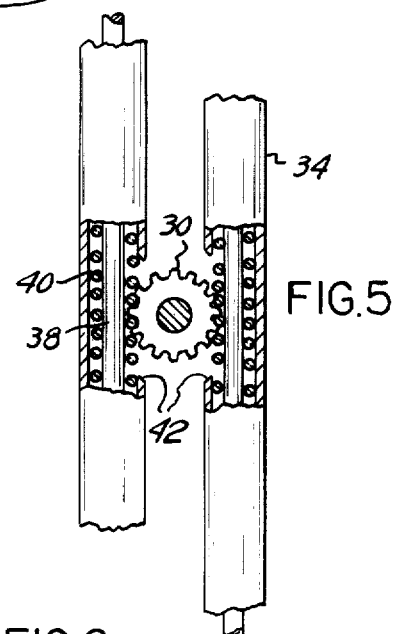
FIG. 5 is a fragmentary sectional view on the line 5—5, FIG. 4.

Referring now to FIG. 5 there is illustrated the drive gear 30 and portions of the associated Teleflex drive units. The drive units each comprise a tubular sheath or housing 34 which is relatively stiff but which may be bent into the required configuration to provide for movement around a bend as for example the bent portion 36 of the housing.

Longitudinally movable within the tubular housings 34 are flexible core members 38 which are sufficiently flexible to move freely around the bent portions 36 of the housings 34. Each of the cores 38 is wrapped with a wire 40 disposed in helical configuration with adjacent convolutions spaced apart so as to provide in effect a rack construction adapted to operate in mesh with the teeth of the drive gear 30. The housing portions 34 are shown in FIG. 5 as parallel to each other and laterally spaced so that the gear 30 is adapted to mesh with the teeth of each of the cores 38 and to drive these simultaneously in opposite directions.

Access is afforded to the wrapped cores 38 through oppositely facing openings 42 in the housings 34.

As will be noted in FIG. 1, the portions of the housings 34 adjacent the gear 30 extend transversely of the vehicle. Since the cores 38 therein are moved in opposite directions by the gear 30, it will be apparent that clockwise rotation of the gear 30 as viewed from above in FIG. 1 will cause the portions of the core in the longitudinally extending portions 44 of the housings to move to the left or forwardly of the vehicle. Reverse rotation of the gear 30 will of course move the longitudinally extending core portions rearwardly of the vehicle.

Means are provided for coupling the longitudinally movable cores 38 to the sun roof panel 16 and these means comprise coupling elements connected to the core and extending through elongated slots provided in the housings 34. The bent housings 34 are suitably supported at the forward edge of the opening 14 and along opposite sides thereof, and the rear ends of the housings are illustrated as connected to suitable support brackets 46.

Figure 7:
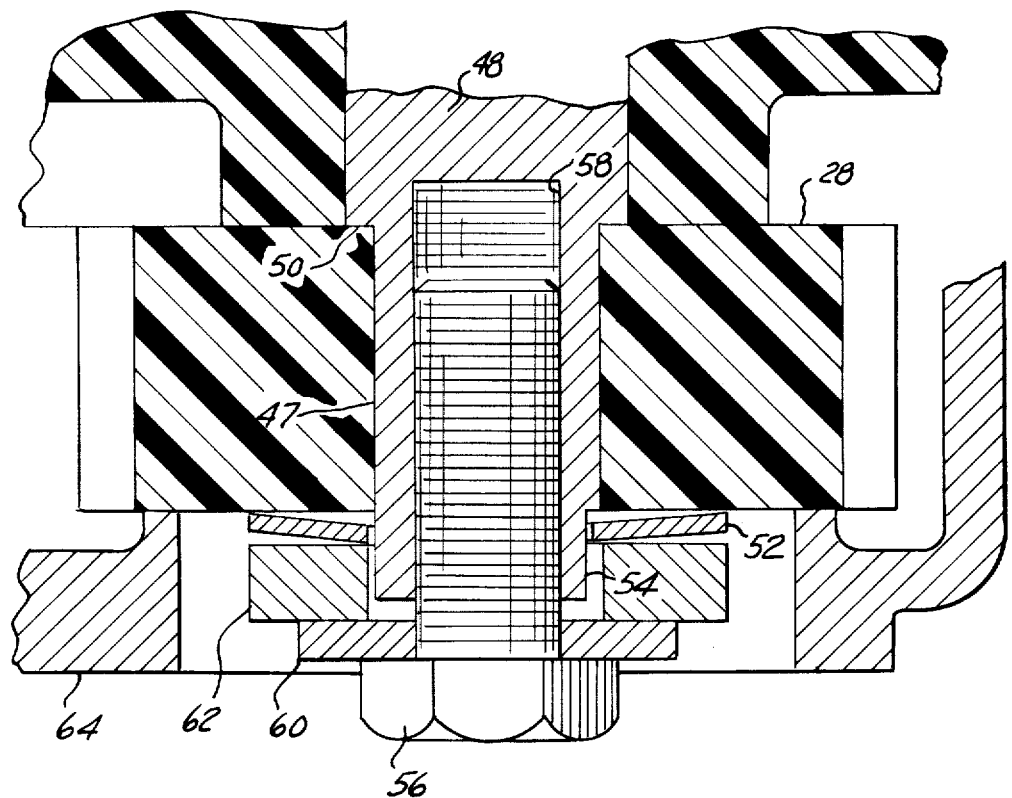
FIG. 7 is an enlarged sectional view of the transmission housing.

Reference is now made to FIGS. 4 and 7 which disclose details of the transmission and transmission housing.

As best seen in FIG. 7, the pinion 28 is rotatably mounted on a reduced portion 47 of shaft 48 which at its upper end is formed with the drive gear 30. The pinion 28 engages against a shoulder 50 on the shaft 48 and a friction drive between the pinion 28 and the shaft 48 is provided by a conical spring washer 52 having a D-shaped hole which interfits with a correspondingly D-shaped end portion of the shaft 48, the D-shape being provided by a flat surface 54 provided on the end of the shaft. A bolt 56 is threaded into an axially extending threaded recess 58 in the end of the shaft and washers 60 and 62 are interposed between the head of the bolt and the spring washer 52. With this arrangement it will be apparent that the pinion 28 is frictionally connected to the end of the shaft 48 so that in the event a part of passenger's body is in the opening in the sun roof when the closure panel is moved toward closed position, the pinion will slip on the drive shaft so as to avoid injury to the person. It will be apparent from FIG. 7 that access for adjusting the effectiveness of the spring 52 is provided by the opening through the bottom wall of the housing, surrounded by the annular flange 80.

The transmission comprising the worm 24, the worm gear 26, and the pinion 28 is located in a transmission housing comprising a main housing 64 which is preferably a casting formed of light metal such as zinc, and a removable cover 66 which is formed of a low friction plastic such for example as Nylon Zytel 101.

The worm gear 26 is mounted on a stub shaft 68 which is preferably provided at its ends with a configuration illustrated at 70 which facilitates interlocking the shaft with the housing 64 by casting in place. Both the worm gear 26 and the pinion 28 are formed of low friction plastic material such for example as Delrin 500. the cover 66 is secured to the transmission housing by assembly screws 72 and the cover is provided with a tubular flange 74 engageable with a limited area at the top of the worm gear 26 and with a similar tubular flange 76 engageable with a limited area at the top of the pinion 28. Similarly, the opposite sides of the worm gear 26 and pinion 28 are engageable with tubular bearing flanges 78 and 80 engabeable with limited areas of the respective worm gear and pinion. In addition, the cover 66 is provided with a recess at the inner side of a boss 82 which receives the free end of the stub shaft 68. With this arrangement, when the cover 66 is tightened down firmly on the upper open side of the housing 64, the worm gear 26 is adequately supported for substantially free rotation on the stub shaft 68 and the pinion 28 is substantially freely rotatable in accurately located position within the transmission housing by the bearing portions formed by the tubular flanges 76 and 80. This comprises a very simple inexpensive but very efficient assembly of the transmission gearing of the transmission housing.

The motor 20 has connected to the rear end thereof a mounting bracket 84. At the forward end of the motor, the output shaft 11 which carries the worm 24, extends through an opening provided in a tubular portion 85 of the transmission housing 64 and into a supporting recess provided in a boss 86. The tubular portion 85 of the transmission housing terminates in a generally flat cylindrical flange 88 and the motor 20 is connected between the bracket 84 and the flange 88 by assembly bolts 90. Accordingly, the motor and transmission housing 64 constitute a substantially rigid assembly.

In order to provide adequate support for the assembly in the most efficient manner, the transmission housing cover 66 is provided with a pair of upstanding elongated bosses 92 through which elongated assembly bolts 94 extend into threaded openings 96 extending through the transmission housing 64. The assembly bolts 94 extend through openings in the top wall 98 of the top, the bracket 84 also being bolted to the top of the vehicle. Thus, the entire assembly of the motor and transmission housing is interconnected and supported by its attachment to the vehicle top.

Attention is further directed to the fact that the drive gear 30 mounted at the upper end of the shaft 48 is interposed between two oppositely extending portions of the Teleflex transmission so that the drive gear 30 and the upper end of the shaft 48 are in effect positively supported against displacement even during rotation, by engagement with the adjacent portions of the securely mounted Teleflex transmission. It will be noted that the shaft 48 is supported throughout a substantial portion of its length by upwardly and downwardly extending tubular portions of the cover 66. Moreover, the pinion 28 is adequately located and supported between the downwardly extending tubular flange 76 and the upwardly extending tubular flange 80 on the cover and housing respectively, thus providing additional support for the lower end of the drive shaft 48.

It will be observed from FIG. 4 that the vehicle top 12 is formed to provide a downwardly extending rain gutter 100. The motor 20 is located at one side of the gutter and the transmission housing extends beneath the gutter to a position beneath the closure 16.

Figure 6:
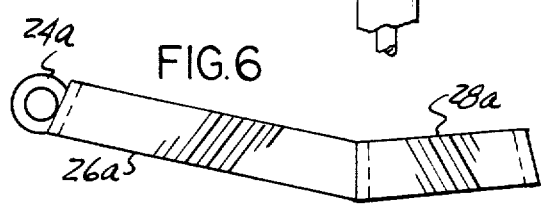
FIG. 6 is a diagrammatic view of the worm-worm gear pinion combination in which the gear and pinion are spiral bevel gears.

In the embodiment of the invention so far described the worm gear 26 and pinion 28 are cylindrical gears and occupy a plane containing the plane of the worm 24. However, in an improved embodiment of the invention, as best illustrated in FIG. 6, a somewhat different arrangement is provided. In this FIGURE the worm is indicated diagrammatically at 24a, the worm gear in mesh with the worm is indicated diagrammatically at 26a, and the pinion is indicated diagrammatically at 28a. As is suggested in this diagrammatic view, the worm gear 26a and pinion 28a are spiral bevel gears, in some cases permitting the assembly to conform better to the space available for mounting the parts.

What I claim as my invention is:

1. A drive assembly for a sliding sun top panel comprising a transmission housing comprising a flat housing member having a bottom wall and an upwardly open recess, a removable cover, a worm in said housing, a worm gear in mesh with said worm, a pinion in mesh with said worm gear, a drive shaft connected to said pinion to be driven thereby upon rotation of said worm and extending upwardly from said cover, and an output drive gear on said shaft outside said housing, said housing member having a permanently fixed stub shaft extending upwardly from said bottom wall, said worm gear being rotatably mounted on said stub shaft, said cover having a recess in which the upper end of said stub shaft is journaled, said bottom wall having a narrow bearing flange surrounding said stub shaft, said cover having a narrow flange surrounding said recess, said worm gear being rotatable on said stub shaft and stabilized by its engagement with both of said narrow bearing flanges, said cover having an opening therethrough which receives the inner end of said drive shaft, an upwardly extending guide sleeve surrounding said opening and receiving said drive shaft, and a narrow bearing flange surrounding said opening at the underside of said cover, said housing member having an opening it its bottom wall aligned with the opening in said cover, a narrow bearing flange surrounding the opening in the bottom wall of said housing member, the portion of said drive shaft within said housing being reduced and providing a shoulder, said pinion being rotatable on the reduced portion of said drive shaft, and friction means coupling said pinion to said drive shaft.

2. An assembly as defined in claim 1, both said worm gear and pinion are formed of low friction material and are located and held in operating position by the pairs of the surfaces of the narrow bearing flanges at opposite sides thereof.

3. A drive assembly for a sliding sun top panel comprising a transmission housing comprising a flat housing member having a bottom wall and an upwardly open recess, a removable cover, a worm in said housing, a worm gear in mesh with said worm, a pinion in mesh with said worm gear, a drive shaft connected to said pinion to be driven thereby upon rotation of said worm and extending upwardly from said cover, and an output drive gear on said shaft outside said housing, said housing member having a permanently fixed stub shaft extending upwardly from said bottom wall, said worm gear being rotatably mounted on said stub shaft, said cover having a recess in which the upper end of said stub shaft is journaled, said worm gear and pinion being bevel gears.

4. An assembly as defined in claim 3 in which said bevel gears are spiral bevel gears.

* * * * *